(12) United States Patent
Gethmann (10) Patent No.: US 8,070,127 B2
(45) Date of Patent: Dec. 6, 2011

(54) MANUAL OVERRIDE APPARATUS FOR LINEAR ACTUATORS

(75) Inventor: Douglas Paul Gethmann, Gladbrook, IA (US)

(73) Assignee: Fisher Controls International, LLC, Marshalltown, IA (US)

(*) Notice: Subject to any disclaimer, the term of this patent is extended or adjusted under 35 U.S.C. 154(b) by 423 days.

(21) Appl. No.: 12/365,663

(22) Filed: Feb. 4, 2009

(65) Prior Publication Data
US 2010/0193715 A1 Aug. 5, 2010

(51) Int. Cl.
*F16K 21/04* (2006.01)
(52) U.S. Cl. .......................... 251/14; 251/62
(58) Field of Classification Search ............ 251/14, 251/62, 66, 74
See application file for complete search history.

(56) References Cited

U.S. PATENT DOCUMENTS

| | | | |
|---|---|---|---|
| 935,856 A | 10/1909 | O'Meara | |
| 2,403,427 A | 7/1946 | Ludeman | |
| 2,630,829 A | 3/1953 | Shafer | |
| 2,890,014 A | 6/1959 | Luoma et al. | |
| 3,290,003 A | 12/1966 | Kessler | |
| 3,734,455 A | 5/1973 | Natho et al. | |
| 3,842,690 A | 10/1974 | Gulick | |
| 3,842,854 A | 10/1974 | Wicke | |
| RE29,322 E | * 7/1977 | Nelson | 251/14 |
| 4,414,995 A | 11/1983 | Spencer | |
| 4,605,039 A | 8/1986 | Johnson et al. | |
| 4,617,992 A | * 10/1986 | Abel | 166/91.1 |
| 4,619,434 A | * 10/1986 | Snyder et al. | 251/14 |
| 4,921,207 A | 5/1990 | Baker | |

(Continued)

FOREIGN PATENT DOCUMENTS
DE 1113344 8/1961
(Continued)

OTHER PUBLICATIONS
International Searching Authority, "International Search Report," issued in connection with PCTUS2008/076251, mailed Dec. 23, 2008, 4 pages.
(Continued)

Primary Examiner — John Fristoe, Jr.
(74) Attorney, Agent, or Firm — Hanley, Flight & Zimmerman, LLC (57) ABSTRACT

Apparatus for manual override operation of a linear actuator are described. An example manual override apparatus includes a manual operator having a first coupling on a first side and a second coupling on a second side opposite the first side. A first drive member having external threads is coupled to a housing of an actuator. The first drive member includes a first end to removably receive the first coupling of the manual operator, a second end to selectively engage an actuation member of the actuator, and a bore therethrough along a longitudinal axis of the first drive member. A second drive member disposed in the bore to be rotatably coupled to the first drive member. The second drive member has a first end threadably coupled to an actuator stem of the actuation member and a second end to removably receive the second coupling of the manual operator. Rotation of the first drive member in a first rotational direction via the manual operator moves the actuation member of the actuator in a first linear direction and rotation of the second drive member relative to the first drive member in the first rotational direction via the manual operator causes the actuation member to move in a second linear direction opposite the first linear direction.

21 Claims, 6 Drawing Sheets

U.S. PATENT DOCUMENTS

| | | | |
|---|---|---|---|
| 4,987,822 | A | 1/1991 | Stoll |
| 5,477,752 | A | 12/1995 | West et al. |
| 6,722,528 | B2 | 4/2004 | Baumann |
| 6,854,704 | B1 * | 2/2005 | Young .......................... 251/61.4 |
| 2005/0199292 | A1 | 9/2005 | Stedman et al. |
| 2008/0149874 | A1 | 6/2008 | Fukano et al. |

FOREIGN PATENT DOCUMENTS

| | | |
|---|---|---|
| EP | 0655574 | 5/1995 |
| EP | 1344947 | 9/2003 |
| EP | 1793114 | 6/2007 |
| FR | 1300618 | 8/1962 |
| WO | 0246652 | 6/2002 |

OTHER PUBLICATIONS

International Searching Authority, "Written Opinion of the International Searching Authority," issued in connection with PCT/US2008/076251, mailed Dec. 23, 2008, 5 pages.

United States Patent and Trademark Office, "Non-Final Office Action," issued in connection with U.S. Appl. No. 11/859,408, mailed Apr. 28, 2011, 27 pages.

International Searching Authority, "International Search Report," issued in connection with international application serial No. PCT/US2010/021392, mailed May 7, 2010, 3 pages.

International Searching Authority, "Written Opinion of the International Searching Authority," issued in connection with international application serial No. PCT/US2010/021392, mailed May 7, 2010, 5 pages.

* cited by examiner

MANUAL OVERRIDE APPARATUS FOR LINEAR ACTUATORS

FIELD OF THE DISCLOSURE

This disclosure relates generally to linear actuators for use with control valves and, more particularly, to manual override apparatus for linear actuators.

BACKGROUND

Many process control valves are actuated (e.g., pneumatically actuated) using well-known diaphragm type or piston type actuators. Actuators may be used to automate control valves such as, for example, linear valves, rotary valves, etc. by supplying force and motion to open or close a valve. Linear valves such as gate, globe, diaphragm, pinch, and angle valves typically have a valve stem (e.g., a sliding stem) that moves a flow control member (e.g., a valve plug) between an open position and a closed position. Rotary valves such as butterfly valves, ball valves, and disk valves typically have a valve shaft that moves a flow control member between an open position and a closed position. An actuator stem operatively couples a linear valve stem or a rotary valve shaft to the actuator (e.g., a pneumatic actuator, hydraulic actuator, etc.).

In operation, a positioner or control unit supplies a control fluid (e.g., air) to the actuator to cause the actuator to position the valve stem or shaft and, thus, the flow control member to a desired position to regulate fluid flow through a valve. When the valve is closed, the flow control member is typically configured to engage an annular or circumferential seal that encircles the flow path through the valve to prevent fluid flow (e.g., in one or both directions) through the valve.

In process control systems, it may be necessary to manually override the position of the flow control member to the open position, the closed position, or any other desired position. For example, it may be necessary to open a valve to prevent overpressurization of a vessel or it may be necessary to close a valve to prevent a spill (e.g., a chemical spill) during emergency situations, power failures, or if the control fluid (e.g., air) supply to an actuator (e.g., a pneumatic) is shut down. Some known example manual override mechanisms provide a hand wheel and screw configuration that is typically mounted directly to an actuator to manually operate a valve. However, these known manual override mechanisms limit manual operation of some valves in one direction and, thus, cannot be used to operate the valve in the other or opposite direction once these valves are manually operated. Therefore, these known manual override mechanisms are not suitable for use with double acting actuators (i.e., actuators in which pressurized fluid is used to open and close the valve).

SUMMARY

In one example, an example manual override apparatus includes a manual operator having a first coupling on a first side and a second coupling on a second side opposite the first side. A first drive member or stem having external threads is coupled to a housing of an actuator. The first drive member includes a first end to receive the first coupling of the manual operator and a second end to selectively engage an actuation member of the actuator. A second drive member or stem is slidably coupled to the first drive member and has a first end threadably coupled to an actuator stem of the actuation member and a second end to receive the second coupling of the manual operator. Rotation of the first drive member in a first rotational direction via the manual operator moves the actuation member of the actuator in a first linear direction and rotation of the second drive member relative to the first drive member in the first rotational direction via the manual operator causes the actuation member of the actuator to move in a second linear direction opposite the first linear direction.

In another example, a control valve includes an actuator having an actuation member disposed within a housing and having an actuator stem coupled to the actuation member at a first end and coupled to a valve stem of a valve at a second end. A third stem has a bore along a longitudinal axis of the stem and an externally threaded portion to couple the third stem to the housing. The third stem is to selectively engage the actuation member to move the actuation member in a first linear direction when the third stem is rotated in a first rotational direction. A leadscrew is rotatably coupled to the third stem. The leadscrew includes a head portion that is to engage a first end of the third stem and a body disposed in the bore of the third stem and includes a threaded portion to threadably engage the first end of the actuator stem such that rotation of the leadscrew relative to the third stem in the first rotational direction is to cause the actuation member to move in a second linear direction opposite the first linear direction.

In yet another example, an example override apparatus includes first means for selectively moving an actuation member of an actuator in which rotation of the first means in a first rotational direction causes the actuation member to move in a first linear direction. The example override apparatus further includes second means for selectively moving the actuation member. The second means is coupled to an actuator stem of the actuation member and rotatably coupled to the first means for selectively moving the actuation member such that rotation of the second means in the first rotational direction relative to the first means for selectively moving the actuation member causes the actuation member to move in a second linear direction opposite the first linear direction. The example further includes means for rotating the first means for selectively moving the actuation member and second means for rotating the second means for selectively moving the actuation member.

DETAILED DESCRIPTION

Figure 3:
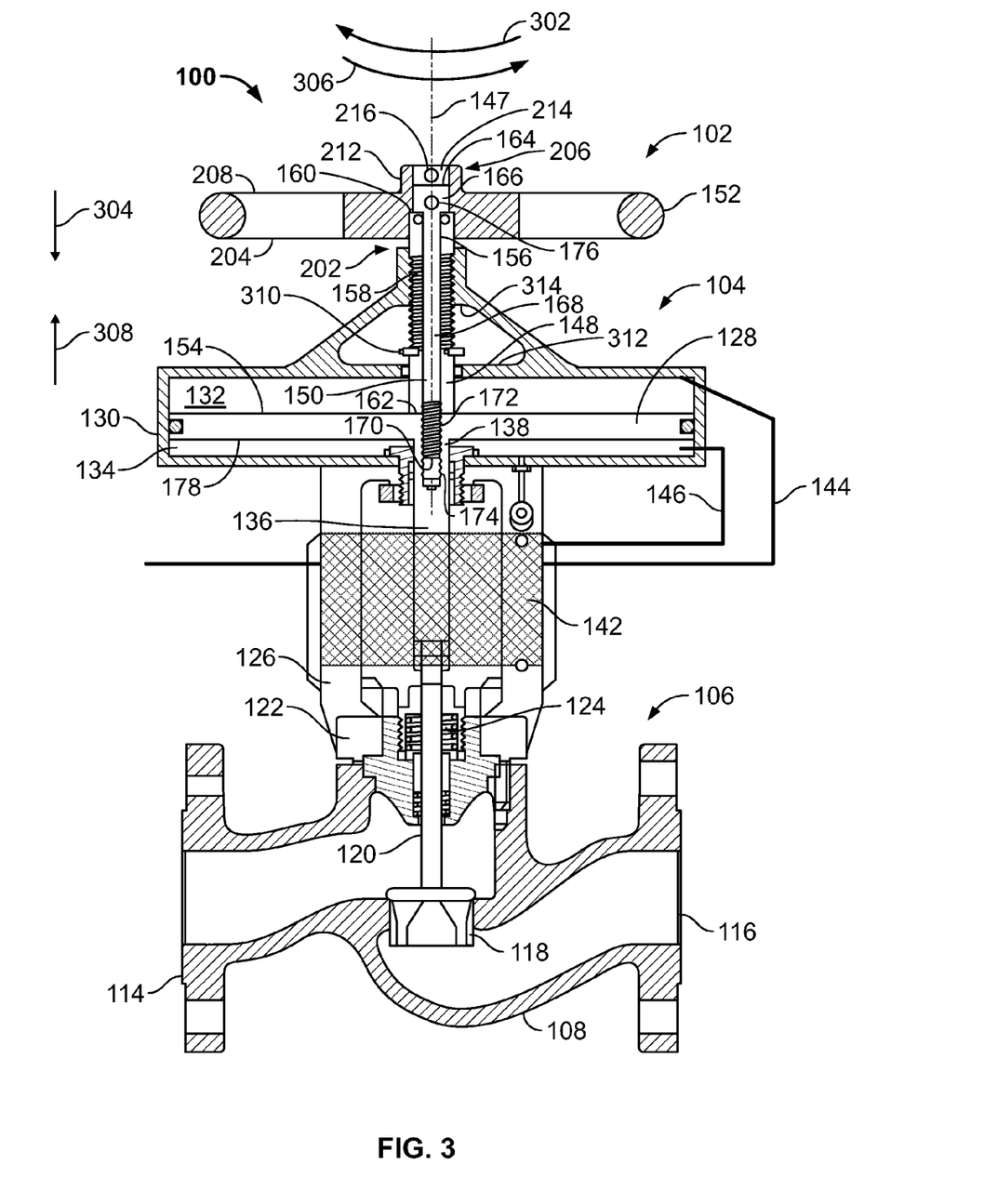
FIG. 3 illustrates a cross-sectional view of the example control valve of FIGS. 1A and 1B manually moved to the closed position via the example manual override apparatus of FIGS. 1A, 1B, 2A and 2B.
Figure 5:
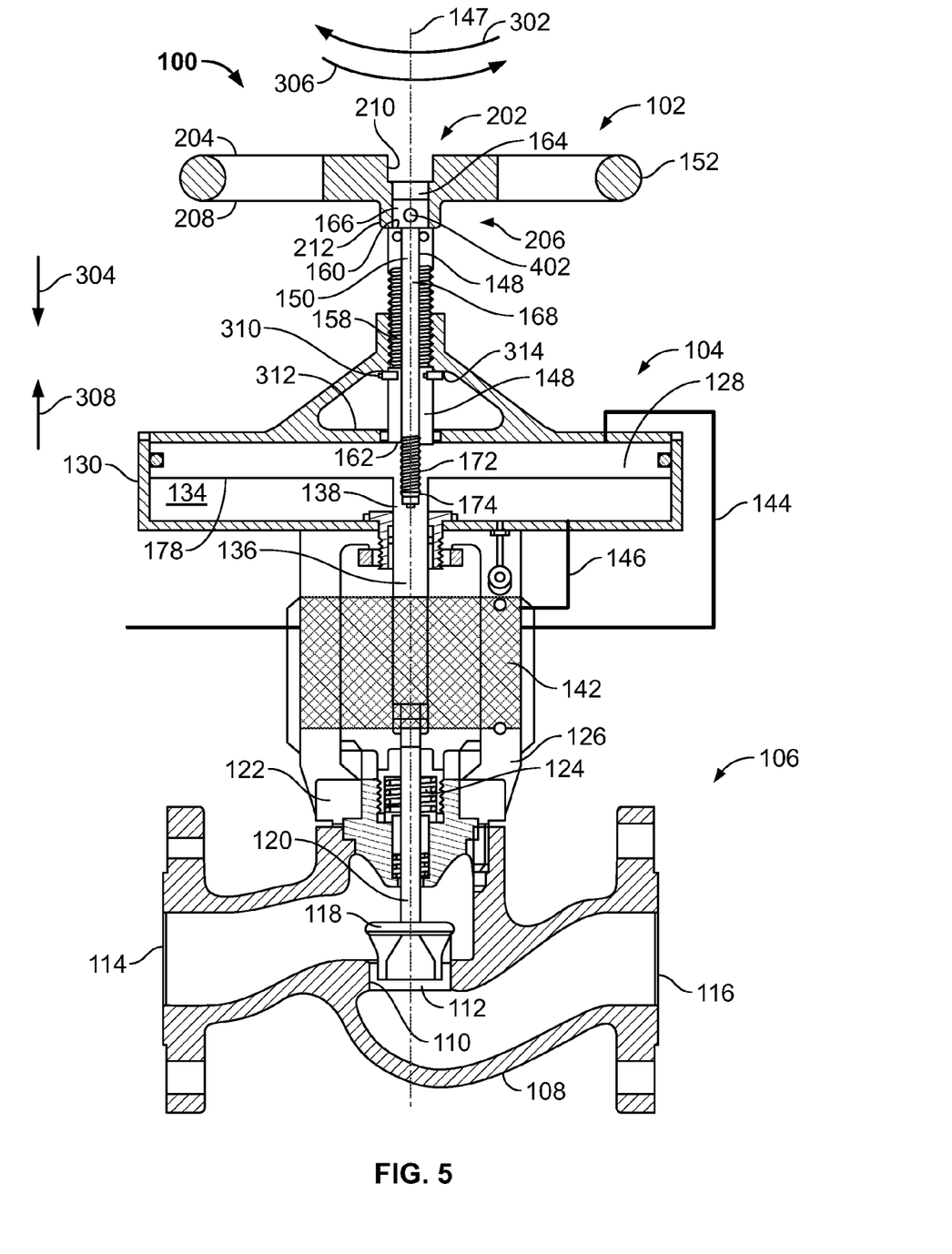
FIG. 5 illustrates a cross-sectional view of the example control valve of FIG. 4 manually moved to the open position via the example manual override apparatus of FIGS. 1A, 1B, 2A and 2B.

During emergency situations, power failures, or if a control fluid (e.g., air) supply to a valve actuator (e.g., pneumatic actuator) fails, it may be necessary to manually override the position of a flow control member of a valve to a desired position (e.g., a closed position of FIG. 3, an open position of FIG. 5, etc.). For example, if the automatic control system fails to supply control fluid to the actuator, it may be necessary to open the valve to prevent overpressurization of a vessel or it may be necessary to close the valve to prevent a spill (e.g., a chemical spill). Generally, known manual override mechanisms for control valves permit manual operation of the valve and do not require an outside power source to move the flow control member of the valve to a desired position. Instead, these known manual override mechanisms typically use a hand wheel, a chain wheel, a lever, a declutchable mechanism, or a combination thereof, to drive a series of gears (e.g., a worm drive gearbox, etc.) providing a reduction that results in a higher output torque compared to an input (manual) torque provided by a person. Thus, during emergency situations, for example, the position of the valve may be manually moved.

Some known manual override mechanisms use a worm drive gearbox in which a self-locking worm and worm gear drive holds the valve in a desired position. However, this configuration usually requires aligning a hole in a manual override stem with a hole in an actuator stem and sliding a pin therethrough to engage the manual override mechanism. During emergency situations, this process can be time consuming and unacceptable. Other known applications utilize a declutchable worm drive gear box that involves manually engaging a lever to enable manual operation of a valve via a hand wheel. However, worm drive gearboxes are relatively expensive, difficult to operate, enlarge the dimensional envelope of the valve and actuator assembly, and involve complex assemblies with the actuator.

Another known example manual override mechanism provides a hand wheel and screw combination that is mounted directly to an actuator to manually operate a valve. However, this known configuration limits operation of some valves in one direction and, thus, once these valves are manually operated, the override mechanism cannot be used to operate the valve in the other or opposite direction. Therefore, these known manual override mechanisms cannot be used with double acting actuators.

In general, the example manual override apparatus described herein may be used to selectively engage or operate an actuator. The example manual override apparatus enables manual control of the actuator to position a flow control member of a valve at any position between a fully open position in which the flow of fluid through the valve is permitted and a fully closed position in which the flow of fluid through the valve is restricted or prevented. The example manual override apparatus described herein is particularly advantageous for use with double acting actuators (i.e., actuators in which pressurized fluid is used to open and close the valve) because the example manual override apparatus provides dual direction operation or rectilinear movement of the actuator (i.e., moving the actuator in a first direction and a second direction opposite the first direction). The example manual override apparatus described herein may be used with valves having a linear actuator such as, for example, control valves, throttling valves, on/off valves, etc. Additionally, the example manual override apparatus may be used with fluid-to-open actuated valves (i.e., valves in which a spring biases the valve in the closed position) or fail-to-close actuated valves (i.e., valves in which a spring biases the valve in the opened position).

Furthermore, in comparison to the above-described known override apparatus, the example manual override apparatus described herein is less expensive and reduces the dimensional envelope of the valve and actuator assembly because the example manual override apparatus does not have a declutchable mechanism or an expensive gear box configuration, which typically involves manually engaging a lever to enable operation of the valve via the manual override apparatus.

Figure 1A:
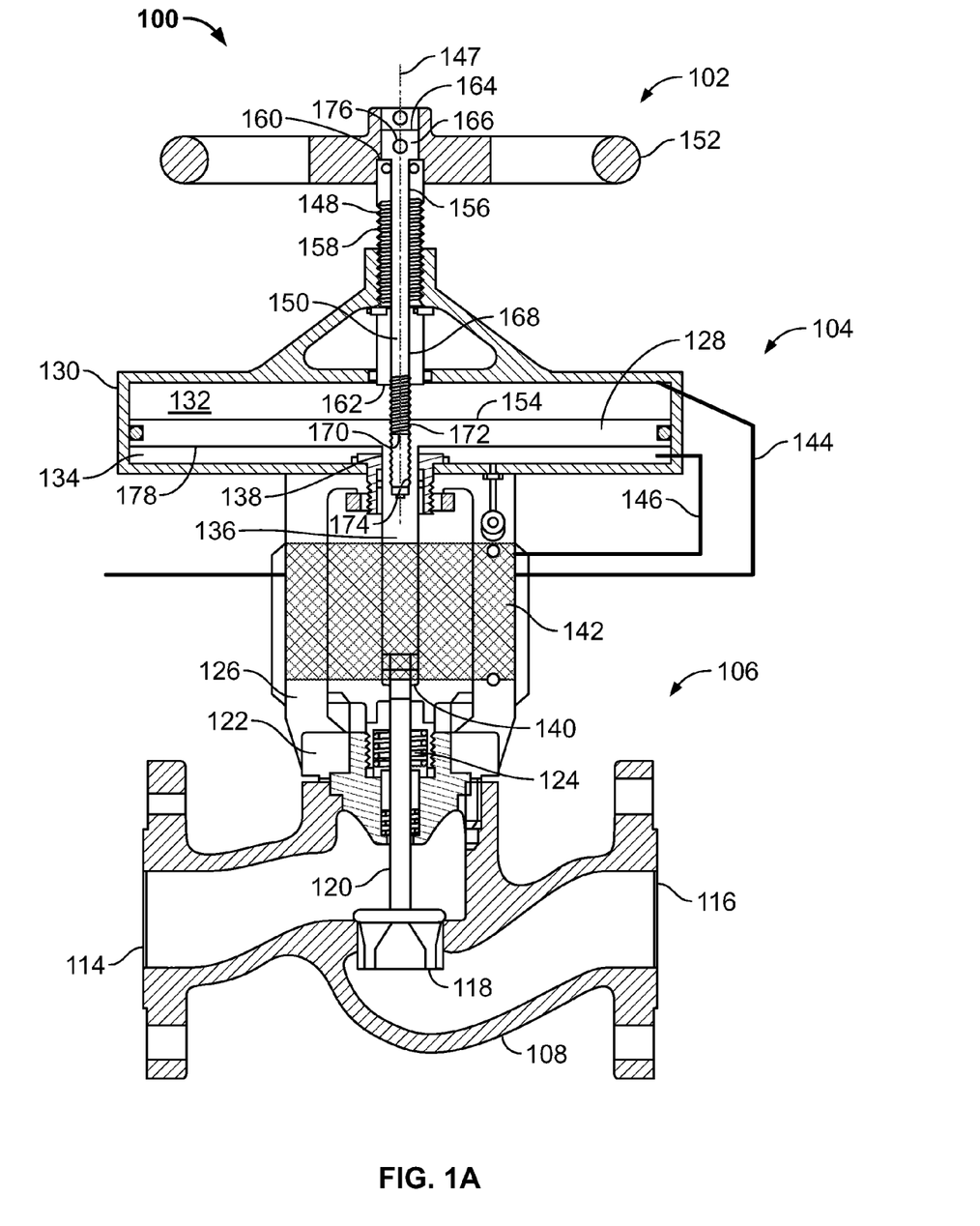
FIG. 1A illustrates a cross-sectional view of an example control valve implemented with a manual override apparatus described herein and shown in a closed position.
Figure 1B:
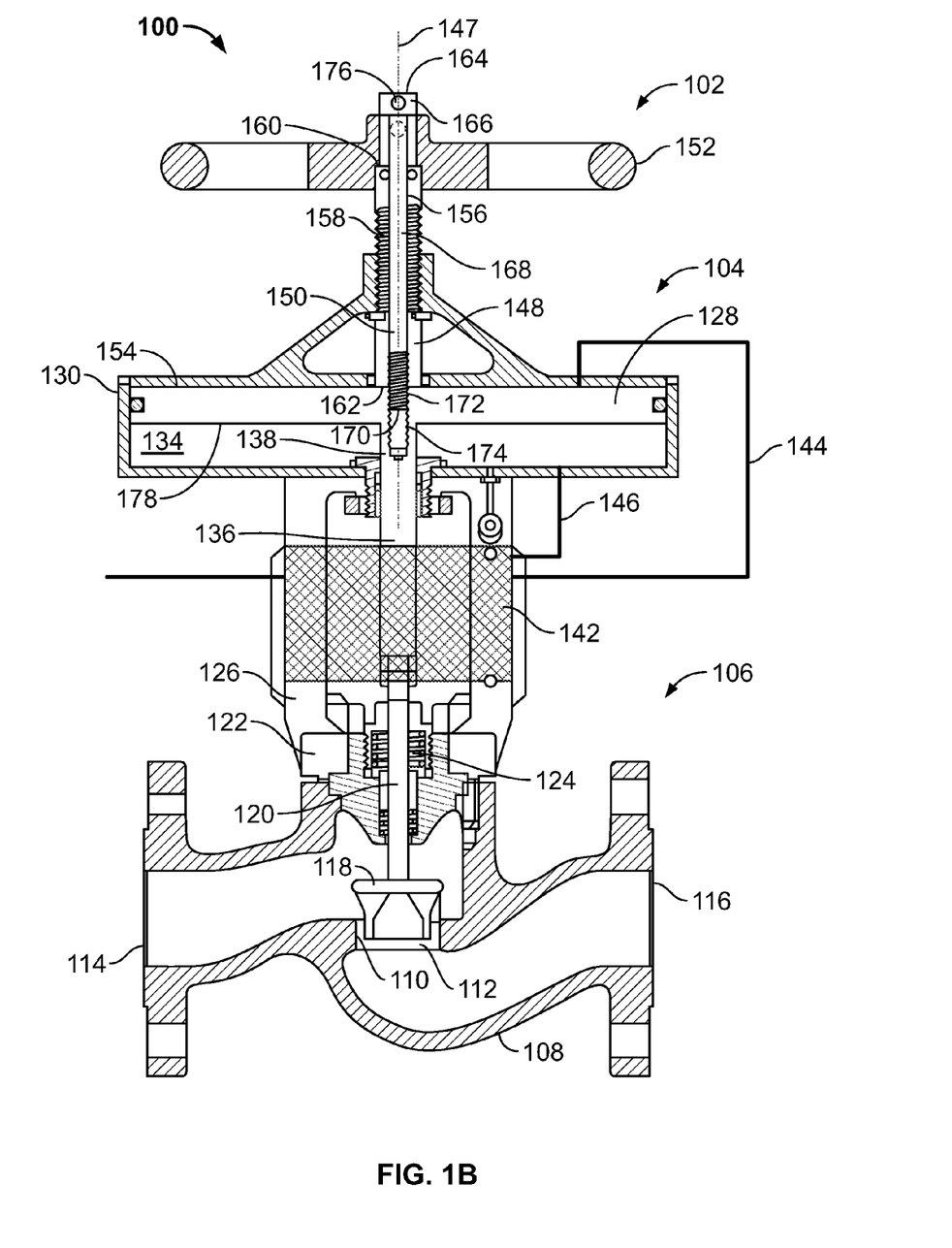
FIG. 1B illustrates a cross-sectional view of the example control valve of FIG. 1A shown in an open position.

FIG. 1A illustrates a cross-sectional view of an example control valve 100 implemented with an example manual override apparatus 102 described herein and showing the example control valve 100 in a closed position. FIG. 1B illustrates a cross-sectional view of the example control valve 100 of FIG. 1A shown in an open position. Referring to FIGS. 1A and 1B, the example control valve 100 includes an actuator 104 to move or operate a valve 106 between an open position to allow fluid flow through the valve 106 and a closed position to prevent or restrict the fluid flow through the valve 106. The valve 106 has a valve body 108 that is the main pressure boundary of the valve 106 and includes a valve seat 110 (FIG. 1B) disposed therein to define an orifice 112 (FIG. 1B) that provides a fluid flow passageway between an inlet 114 and an outlet 116.

A flow control member 118 is operatively coupled to the actuator 104 via a valve stem 120. The actuator 104 moves the flow control member 118 in a first direction (e.g., toward the valve seat 110) to restrict or prevent the flow of fluid between the inlet 114 and the outlet 116 as shown in FIG. 1A and a second direction (e.g., away from the valve seat 110) to allow the flow of fluid between the inlet 114 and the outlet 116 as shown in FIG. 1B. Thus, the position of the flow control member 118 relative to the valve seat 110 varies or controls the fluid flow rate through the control valve 100.

A bonnet 122 houses the valve stem 120 and includes a packing system 124 to prevent leakage of process fluid along the valve stem 120 and outside the valve body 108 into the environment surrounding the valve 100. Also, the bonnet 122 couples the valve body 108 to a yoke 126, which couples the valve 106 to the actuator 104. In some examples, a cage (not shown) may be disposed in the valve body 108 to slidably receive the flow control member 118 to provide certain flow characteristics of the fluid (e.g., reduced noise, reduced cavitation generated by the flow of fluid through the valve 106, etc.).

The actuator 104 shown in FIGS. 1A and 1B is commonly referred to as a double acting actuator (i.e., in which pressurized fluid is used to open and close the valve 108). An actuation member 128 (e.g., a piston, a diaphragm, etc.) is disposed within a housing 130 to define a first chamber 132 and a second chamber 134. An actuator stem 136 is coupled to the actuation member 128 at a first end 138 and is coupled to the valve stem 120 at a second end 140. A travel indicator (not shown) may be coupled to the second end 140 of the actuator stem 136 or the valve stem 120 to follow or indicate the position of the actuator 104 and, thus, the position of the flow control member 118 relative to the valve seat 110 (e.g., an open position, a closed position, an intermediate position, etc.).

The travel indicator may be configured to provide a signal (e.g., a mechanical signal, an electrical signal, etc.) to a control unit or positioner 142. The control unit or positioner 142 supplies control fluid (e.g., pressurized air, hydraulic oil, etc.) to the first chamber 132 via a first port or passageway 144 (e.g., a hose) and the second chamber 134 via a second port or passageway 146 (e.g., a hose) based on the signal (e.g., a mechanical signal, an electronic signal, etc.) provided by the travel indicator. As a result, the pressure differential across the actuation member 128 moves the actuation member 128 in a first direction (e.g., a rectilinear path along an axis 147)

and a second direction (e.g., a rectilinear path along the axis 147) opposite the first direction.

As noted above, in some applications, it may be necessary to manually override the position of the flow control member 118 to a desired position during emergency situations, power failures, etc. The example manual override apparatus 102 enables manual movement or operation of the flow control member 118 between the closed position shown in FIG. 1A and the open position shown in FIG. 1B. In this example, the manual override apparatus 102 includes a first drive member 148 that slidably receives a second drive member or stem, 150. In this example, the first drive member 140 is a stem and the second drive member 150 is a leadscrew. However, in other examples, the first drive member 148 or the second drive member 150 may be a stem, a shaft, or any other suitable drive members. A manual operator 152 removably couples to either of the stem 148 and/or the leadscrew 150 to manually drive the stem 148 or the leadscrew 150. The stem 148 and the leadscrew 150 are coaxially aligned with the actuator stem 136 about the axis 147.

In this example, the stem 148 is threadably coupled to the housing 130 of the actuator 104 and is driven in a first direction along a rectilinear path along the axis 147 to selectively engage a first side 154 of the actuation member 128. The stem 148 includes a body having a bore 156 and having at least an externally threaded portion 158 between a first end 160 and a second end 162. In this example, the threads of the threaded portion 158 are right-handed threads. However, in other examples, the threads of the threaded portion 158 may be left-handed threads and/or any other suitable threads. Additionally, in this example, the first end 160 of the stem 148 has a hex-shaped cross-sectional shape. However, in other examples, the first end 160 may have a square cross-sectional shape or any other suitable cross-sectional shape.

The leadscrew 150 is slidably and rotatably coupled to the stem 148. In this example, the leadscrew 150 includes a first end 164 having a head portion 166 to engage the first end 160 of the stem 148 and a body 168 disposed within (e.g., in a bore of) the hollow body 156 of the stem 148. At least a portion of the body 168 of the leadscrew 150 at a second end 170 has threads 172 to threadably engage the first end 138 of the actuator stem 136. The first end 138 of the actuator stem 136 has a threaded aperture 174 to receive the second end 170 of the leadscrew 150. In this example, the leadscrew 150 has right-handed threads substantially similar to (e.g., having the same pitch as) the right-handed threads of the threaded aperture 174 of the actuator stem 136. However, in other examples, the threads 172 of the leadscrew 150 and/or the threads of the threaded aperture 174 may be left-handed threads and/or any other suitable threads. The head portion 166 of the leadscrew 150 has an aperture 176 substantially perpendicular to the axis 147.

Figure 2A:
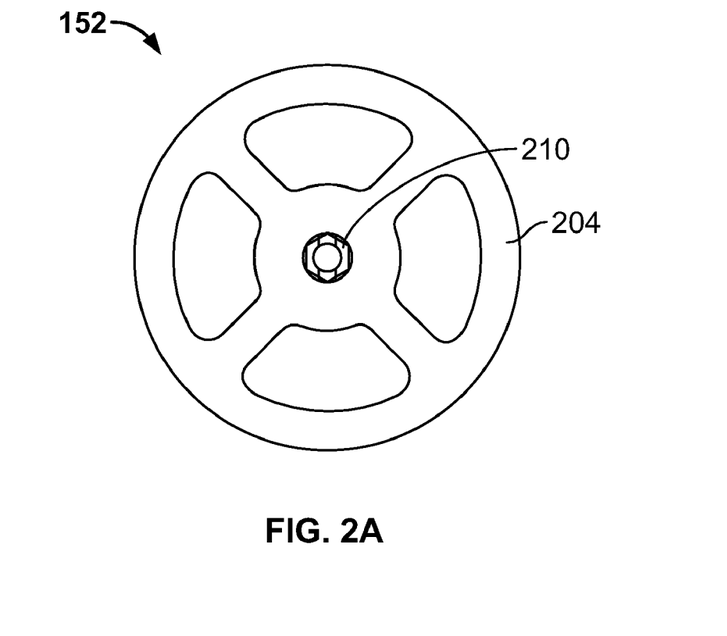
FIG. 2A is a plan view of the example manual operator of FIGS. 1A and 1B and FIG. 2B is a cross-sectional view of the example manual operator of FIGS. 1A, 1B, and 2A.
Figure 2B:
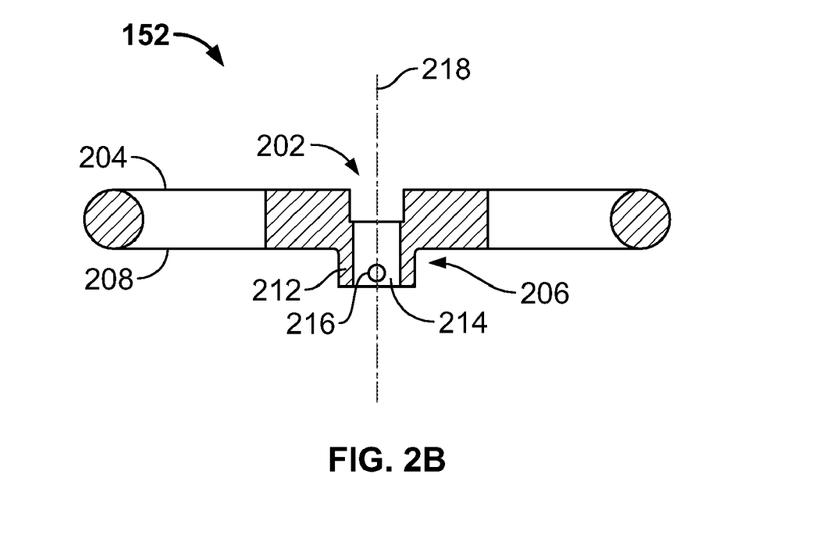

The manual operator 152 selectively drives the stem 148 and the leadscrew 150. FIG. 2A is a top view of the manual operator 152 of FIGS. 1A and 1B and FIG. 2B is a cross-sectional view of the manual operator 152 of FIGS. 1A, 1B, and 2A. As most clearly shown in FIGS. 2A and 2B, the manual operator 152 is depicted as a handwheel. The manual operator 152 includes a first coupling 202 on a first side 204 of the manual operator 152 and a second coupling 206 on a second side 208 opposite the first side 204. The first coupling 202 removably couples the manual operator 152 to the first end 160 of the stem 148 to rotate the stem 148 about the axis 147. In this example, the first coupling 202 includes an aperture 210 having a hex cross-sectional shape that is to matably engage the hex cross-sectional shape of the first end 160 of the stem 148. In other examples, the first coupling 202 may have any suitable cross-sectional shape substantially similar or complementary to the cross-sectional shape of the first end 160 of the stem 148. In yet other examples, the first coupling 202 may couple to the stem 148 via any other suitable fastening mechanism(s) such as, for example, a pin, a fastener, a clip, etc.

The second coupling 206 removably couples the manual operator 152 to the first end 164 of the leadscrew 150 to rotate the leadscrew 150 about the axis 147. In this example, the second coupling 206 includes a cylindrically shaped hub 212 having a bore 214 to receive the first end 164 (i.e., the head 166) of the leadscrew 150. The hub 212 includes an aperture 216 substantially perpendicular to an axis 218 of the hub 212. To couple the manual operator 152 to the leadscrew 150, the aperture 176 in the head 166 of the leadscrew 150 aligns with the aperture 216 of the hub 212 to receive a pin or clip member 402 (FIGS. 4 and 5) when the manual operator 152 is coupled to the leadscrew 150 via the second coupling 206. The pin 402 is required only to couple the manual operator 152 to the leadscrew 150 via the second coupling 206. Thus, the pin 402 is removed from the apertures 176 and 216 in normal operations and/or when the manual operator 152 is coupled to the stem 148 via the first coupling 202. The pin member 402 may be, for example, a pin having a spring detent and may include a ring to facilitate its removal from or insertion into the apertures 176 and 216. Additionally, although not shown, the pin member 402 may be tethered to the manual operator 152.

In operation, referring to FIGS. 1A, 1B, 2A, and 2B, the manual operator 152 is coupled to the stem 148 via the first coupling 204 (and the pin 402 is removed from the apertures 176 and 216). The positioner 142 supplies control fluid to the first chamber 132 to exert a force on the first side 154 of the actuation member 128 that is greater than the force exerted on a second side 178 of the actuation member 128 by the control fluid in the second chamber 134 (e.g., the fluid in the second chamber 134 is released or removed via the second port 146) to move the actuation member 128 in a first direction (e.g., a downward direction in the orientation of FIG. 1A). Movement of the actuation member 128 in the first direction causes the actuator stem 136, the valve stem 120 and, thus, the flow control member 118 to move in a rectilinear path along the axis 147 toward the valve seat 110. As shown in FIG. 1A, in the closed position, the flow control member 118 sealingly engages the valve seat 110 to prevent the flow of fluid through the valve 106.

Conversely, to move the actuation member 128 in a second direction (e.g., an upward direction) opposite the first direction, the positioner 142 supplies control fluid to the second chamber 134 to exert a force on the second side 178 of the actuation member 128 that is greater than the force exerted on the first side 154 of the actuation member 128 by the fluid in the first chamber 132 (e.g., the fluid in the first chamber 132 is released or removed via the first port 144). Movement of the actuation member 128 in the second direction causes the actuator stem 136, the leadscrew 150, and the valve stem 120 to move in the second direction and, thus, the flow control member 118 to move in a rectilinear path along the axis 147 away from the valve seat 110 to allow the flow of fluid through the valve 106 as shown in FIG. 1B. Thus, the positioner 142 supplies control fluid to the first and second chambers 132 and 134 to vary the position of the flow control member 118 between the closed position (FIG. 1A) at which the flow control member 118 sealingly engages the valve seat 110 and the fully open or maximum flow rate position (FIG. 1B) at which the flow control member 118 is spaced away from the valve seat 110.

Thus, in operation, the manual override apparatus 102 does not affect or impair the automatic operation of the control valve 100. More specifically, the manual override apparatus 102 does not interfere with the actuator 104 when the control valve 100 is operating normally between the first position (FIG. 1A) and the second position (FIG. 1B) while the manual operator 152 coupled to the first end 160 of the stem 148 via the first coupling 202. Also, although the leadscrew 150 is threadably coupled to and, thus, moves in a rectilinear path along the axis 147 with the actuator stem 136, the leadscrew 150 (or the manual override apparatus 102) does not interfere with the operation of the control valve 100. As clearly shown in FIG. 1B, because the leadscrew 150 is not coupled to the manual operator 152 (e.g., a pin is removed from the apertures 176 and 216) when the control valve 100 is in operation (and when the manual operator 152 is coupled to the stem 148), the leadscrew 150 slides within the hollow body 156 (e.g., the bore) of the stem 148. The first end 164 (e.g., the head 166) slides through the apertures 210 and 214 of the manual operator 152. Thus, during normal (e.g., automatic) operation, the manual operator 152 may be coupled to the control valve 100 such that the the first coupling 202 of the manual operator 152 engages the first end 160 of the stem 148. Alternatively, the manual operator 152 may be removed from the control valve 100 during normal operation.

FIG. 3 illustrates the example control valve 100 having the flow control member 118 manually moved to the closed position via the example manual override apparatus 102. To use the manual override apparatus 102 to move the example control valve 100 to the closed position of FIG. 3 from the position of FIG. 1B, the first coupling 202 of the manual operator 152 is coupled to the first end 160 of the stem 148. As noted above, in this example, the pin member 402 is not required when the manual operator 152 is coupled to the stem 148 via the first coupling 204. An operator manually rotates the manual operator 152 in a first rotational direction 302 (e.g., a clockwise direction) about the axis 147. Rotation of the manual operator 152 in the first rotational direction 302 causes the stem 148 to rotate in the first rotational direction 302. In turn, because the threads of the stem 148 are right-handed threads, rotation of the stem 148 in the first rotational direction 302 causes the stem 148 to move in a first linear direction 304 (e.g., a downward direction toward the actuation member 128 in the orientation of FIG. 3) along the axis 147. The second end 162 of the stem 148 engages the first side 154 of the actuation member 128 to move or displace the actuation member 128 and, thus, the flow control member 118 along a rectilinear path in the first linear direction 304 so that the flow control member 118 sealingly engages the valve seat 110 to prevent the flow of fluid through the valve 106 as shown in FIG. 3.

To move the second end 162 of the stem 148 away from the actuation member 128 (e.g., to the position of FIG. 1B), the operator rotates the manual operator 152 in a second rotational direction 306 (e.g., a counterclockwise direction) opposite the first rotational direction 302 (e.g., the clockwise direction). Rotation of the stem 148 in the second rotational direction 306 causes the second end 162 to retract or move in a second linear direction 308 (e.g., in a direction away from the first side 154 of the actuation member 128). Thus, the stem 148 translates rotational motion to linear motion to selectively engage the actuation member 128 and drive the actuation member 128 in the first linear direction 304.

A retainer 310 (e.g., a C-ring) is disposed along a portion of the stem 148 that engages a first surface 312 of the housing 130 to limit movement of the stem 148 in the first linear direction 304 when the stem 148 is rotated in the first rotational direction 302. Likewise, the retainer 310 engages a second surface 314 of the housing 130 to prevent or limit movement of the stem 148 in the second linear direction 308 when the stem 148 is rotated in the second rotational direction 306.

Figure 4:
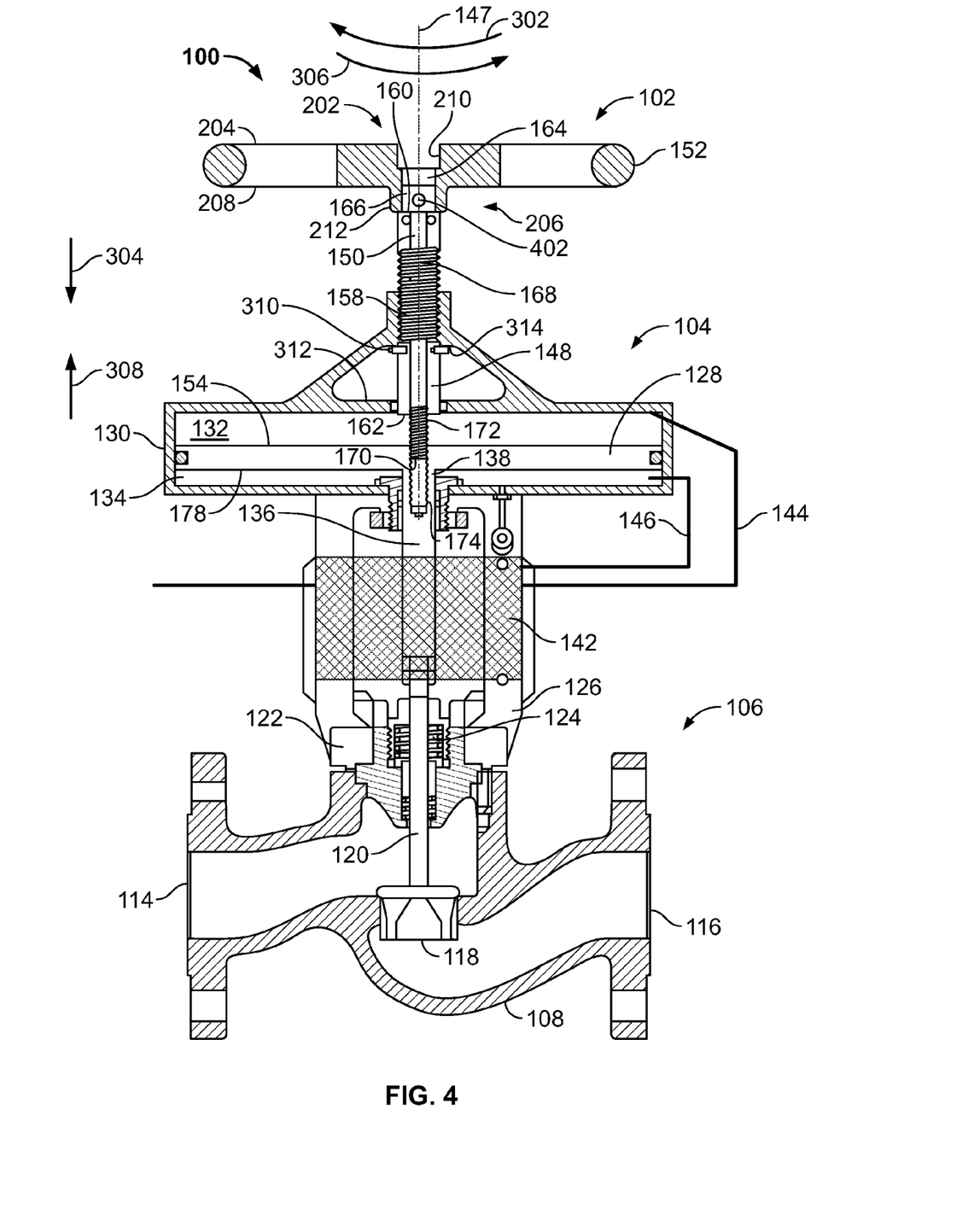
FIG. 4 illustrates a cross-sectional view of the example control valve of FIGS. 1A and 1B in a failed closed position.

FIG. 4 illustrates the control valve 100 in a failed closed position and FIG. 5 illustrates the control valve 100 manually moved to the open position via the manual override apparatus 102. Referring to FIGS. 4 and 5, to move the example control valve 100 to the open position via the manual override apparatus 102, an operator turns over (e.g., flips) the manual operator 152 so that the first side 204 of the manual operator 152 is opposite (e.g., facing away) from the actuator 102. The second coupling 206 is coupled to or engages the head 166 of the leadscrew 150 so that the aperture 176 of the head 166 and the aperture 216 of the hub 212 are aligned. The operator inserts the pin 402 through the apertures 176 and 216 to couple the manual operator 152 to the leadscrew 150. The operator rotates the leadscrew 150 in the first rotational direction 302. Rotation of the leadscrew 150 in the first rotational direction 302 causes the leadscrew 150 to rotate relative to the stem 148. Because the manual operator 152 is coupled to the leadscrew 150 via the second coupling 204, rotation of the leadscrew 150 does not cause the stem 148 to rotate in the first rotational direction 302 or the second rotational direction 306. In other words, the leadscrew 150 rotates relative (e.g., within) the stem 148 when the manual operator 152 is coupled to the leadscrew 150 via the second coupling 204.

As the leadscrew 150 is rotated relative to the stem 148, the head 166 of the leadscrew 150 engages the first end 160 of the stem 148. Thus, the leadscrew 150 does not move in the first linear direction 304 along the axis 147 (e.g., toward the actuation member 128) because the stem 148 is stationary (i.e., does not move in either the first or second rotational directions 302 or 306 or the first and second linear directions 304 and 308) while the leadscrew 150 rotates in the first rotational direction 302. As a result, as the leadscrew 150 rotates relative to the stem 148 in the first rotational direction 302, the threads 172 of the leadscrew 150 engage the threads of the threaded aperture 174 of the actuator stem 136. In turn, the threads (e.g., right-handed threads) cause the actuator stem 136 to move (e.g., lift) in the second linear direction 308 and, thus, causes the actuation member 128 to move in a rectilinear path along the axis 147 in the second linear direction 308 (e.g., toward the first chamber 132). As a result, rotation of the leadscrew 150 relative to the stem 148 in the first rotational direction 302 causes the flow control member 118 to move to the open position of FIG. 5. Therefore, the leadscrew 150 translates rotational motion of the leadscrew 150 to linear motion of the actuation member 128 of the actuator 104 along a rectilinear path in the second linear direction 308 (e.g., an upward direction).

In this example, frictional forces between the stem 148 and the leadscrew 150 do not cause the stem 148 to rotate with the leadscrew 150 when the leadscrew 150 is rotated via the second coupling 206 of the manual operator 152 because the head portion 166 engages the first end 160 of the stem 148 and the pin member 402 couples the manual operator 152 to the leadscrew 150. In other words, the manual operator 152 does not engage the stem 148 when the manual operator 152 is coupled to the leadscrew 150 via the second coupling 206. However, in some instances, frictional forces (e.g., between the bore 214 and the head portion 166) may cause the leadscrew 150 to rotate together with the stem 148 when the stem 148 is rotated in the first or second rotational directions 302 and 306 about the axis 147 via the first coupling 202. In this instance, however, the leadscrew 150 does not cause the actuation member 128 to move in the first or second linear directions 304 and 308, respectively, because the external threads (e.g., right-handed threads) of the stem 148 have a pitch substantially similar or identical to the pitch of the threads 172 (e.g., right-handed threads) of the second end 170 of the leadscrew 150. Instead, for example, rotation of the first and second drive members 148 and 150 in the first rotational direction 302 causes the leadscrew 150 to thread further into the actuator stem 136 without causing the actuation member 128 to displace because the stem 148 also moves in the first linear direction 304 along with the leadscrew 150 (i.e., the leadscrew 150 does not rotate relative to the stem 148).

The example override apparatus 102 is not limited to the example actuator 104 (e.g., a double acting actuator) described herein. The example override apparatus 102 may be used with any actuators such as, for example, spring return piston actuators, and/or any other suitable actuator commonly used to operate control valves. Additionally, the example described in connection with the manual override apparatus is not limited to the example valve 106 of FIGS. 1A and 1B and may be used with various types of valves such as, for example, a sliding stem valve (e.g., a gate valve, a globe valve, etc.), a rotary valve (e.g., a ball valve, a disk valve, a butterfly valve, etc.) and/or any other suitable valve that are operated via linear actuators such as, for example, the actuator 104 of FIG. 1B and/or any other suitable actuator.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A manual override apparatus for use with a valve, comprising:
    a manual operator having a first coupling on a first side and a second coupling on a second side opposite the first side;
    a first drive member having external threads and coupled to a housing of an actuator, wherein the first drive member includes a first end to removably receive the first coupling of the manual operator, a second end to selectively engage an actuation member of the actuator, and a bore therethrough along a longitudinal axis of the first drive member; and
    a second drive member disposed in the bore to be rotatably coupled to the first drive member, wherein the second drive member has a first end threadably coupled to an actuator stem of the actuation member and a second end to removably receive the second coupling of the manual operator,
    wherein rotation of the first drive member in a first rotational direction via the manual operator moves the actuation member of the actuator in a first linear direction and rotation of the second drive member relative to the first drive member in the first rotational direction via the manual operator causes the actuation member to move in a second linear direction opposite the first linear direction.

2. An apparatus as described in claim 1, wherein the second drive member is slidably coupled to the first drive member.

3. An apparatus described in claim 1, wherein the manual operator comprises a handwheel.

4. An apparatus as described in claim 1, wherein the first coupling of the manual operator comprises a hex-shaped aperture to receive the first end of the first drive member and the second coupling of the manual operator comprises a hub having a bore to receive the second end of the second drive member and an aperture substantially perpendicular to the bore.

5. An apparatus as described in claim 4, wherein the first end of the first drive member comprises a hex shape.

6. An apparatus as described in claim 4, wherein the second end of the second drive member includes a cylindrically-shaped body having an aperture that is to align with the aperture of the second coupling to receive a pin to couple the second drive member to the second coupling of the manual operator when the second drive member is to be rotated in the first direction.

7. An apparatus as described in claim 6, wherein the cylindrically-shaped body engages the first end of the first drive member to prevent rectilineal movement of the second drive member along a longitudinal axis of the actuator stem as the second drive member is rotated relative to the first drive member via the manual operator.

8. An apparatus as described in claim 1, wherein the first drive member and the second drive member are substantially coaxially aligned with the actuator stem.

9. An apparatus as described in claim 1, wherein the threads of the first drive member and the threads of the second drive member have the same pitch.

10. A control valve, comprising:
    an actuator having an actuation member disposed within a housing and an actuator stem coupled to the actuation member at a first end and coupled to a valve stem of a valve at a second end;
    a third stem having a bore along a longitudinal axis of the stem and an externally threaded portion to couple the third stem to the housing, wherein the third stem is to selectively engage the actuation member to move the actuation member in a first linear direction when the third stem is rotated in a first rotational direction; and
    a leadscrew rotatably coupled to the third stem, wherein the leadscrew includes a head portion that is to engage a first end of the third stem and a body disposed in the bore of the third stem, wherein the body has a threaded portion to threadably engage the first end of the actuator stem such that rotation of the leadscrew relative to the third stem in the first rotational direction is to cause the actuation member to move in a second linear direction opposite the first linear direction.

11. A control valve as described in claim 10, wherein the leadscrew is slidably coupled to the third stem.

12. A control valve as described in claim 10, wherein the first end of the stem comprises a hex-shaped end and a second end is to engage a first side of the actuation member when the third stem is rotated in the first rotational direction.

13. A control valve as described in claim 10, wherein the head of the leadscrew comprises a cylindrical member having a first aperture perpendicular to a longitudinal axis of the cylindrical member.

14. A control valve as described in claim 10, further comprising a manual operator having a first coupling portion to couple the manual operator to the first end of the third stem and a second coupling portion to couple to the manual operator to the second end of the leadscrew.

15. A control valve as described in claim 14, wherein the first coupling portion of the manual operator comprises a hex-shaped aperture to receive a hex-shaped end of the third stem.

16. A control valve as described in claim 14, wherein the second coupling portion comprises a hub having a bore to slidably receive the head portion of the leadscrew and a first aperture substantially perpendicular to an axis of the hub that is to align with a second aperture of the head portion when the second coupling is coupled to the leadscrew.

17. A control valve as described in claim 16, wherein the first and second apertures are to receive a pin to couple the manual operator to the leadscrew when coupled to the leadscrew via the second coupling.

18. A manual override mechanism, comprising;
   first means for selectively moving an actuation member of an actuator, wherein rotation of the first means in a first rotational direction causes the actuation member to move in a first linear direction;
   second means for selectively moving the actuation member, wherein the second means is coupled to an actuator stem of the actuation member and rotatably coupled to the first means for selectively moving the actuation member such that rotation of the second means in the first rotational direction relative to the first means for selectively moving the actuation member causes the actuation member to move in a second linear direction opposite the first linear direction; and
   means for rotating the first means for selectively moving the actuation member and second means for rotating the second means for selectively moving the actuation member.

19. A manual override mechanism as described in claim 18, wherein the first means for selectively moving the actuation member comprises an externally threaded screw having a bore along a longitudinal axis, wherein the externally threaded screw is to be selectively rotated in the first rotational direction to drive the externally threaded screw toward the actuation member to move the actuation member in the first linear direction.

20. A manual override mechanism as described in claim 18, wherein the second means for selectively moving the actuation member comprises a leadscrew threadably coupled to the actuator stem at a first end and a head at a second end to engage a first end of the first means for selectively moving the actuation member so that rotation of the leadscrew in the first rotational direction relative to the first means for selectively moving the actuation member causes the actuation member to move in the second linear direction opposite the first linear direction.

21. A manual override mechanism as described in claim 18, wherein the first means for rotating the first means for selectively moving the actuation member and the second means for rotating the second means for selectively moving the actuation member comprises a handwheel having a first aperture to engage the first means for selectively moving the actuation member and a second aperture different from the first aperture to engage the second means for selectively moving the actuation member.

* * * * *